US011181292B2

(12) United States Patent
Matsuo et al.

(10) Patent No.: US 11,181,292 B2
(45) Date of Patent: Nov. 23, 2021

(54) INFORMATION OUTPUT SYSTEM, DEVICE CONTROL SYSTEM, INFORMATION OUTPUT METHOD, AND PROGRAM

(71) Applicant: PANASONIC INTELLECTUAL PROPERTY MANAGEMENT CO., LTD., Osaka (JP)

(72) Inventors: Nobuo Matsuo, Hyogo (JP); Yanfeng Wang, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 271 days.

(21) Appl. No.: 16/348,480

(22) PCT Filed: Nov. 6, 2017

(86) PCT No.: PCT/JP2017/039896
§ 371 (c)(1),
(2) Date: May 8, 2019

(87) PCT Pub. No.: WO2018/088349
PCT Pub. Date: May 17, 2018

(65) Prior Publication Data
US 2019/0264941 A1    Aug. 29, 2019

(30) Foreign Application Priority Data

Nov. 8, 2016 (JP) ............................. JP2016-218469

(51) Int. Cl.
*G06F 21/00* (2013.01)
*F24F 11/58* (2018.01)
(Continued)

(52) U.S. Cl.
CPC ............ *F24F 11/58* (2018.01); *F24F 11/523* (2018.01); *F24F 11/62* (2018.01); *G06F 21/305* (2013.01);
(Continued)

(58) Field of Classification Search
CPC .......... F24F 11/30; F24F 11/523; F24F 11/58; F24F 11/62; F24F 2120/10; G06F 21/305; G06Q 10/00; H04Q 9/00
See application file for complete search history.

(56) References Cited

U.S. PATENT DOCUMENTS 10,389,729 B2 *  8/2019  Troesch ................ H04L 63/107
2003/0024976 A1 *  2/2003  Komurasaki ........... B60R 25/24
                                                              235/375

(Continued)

FOREIGN PATENT DOCUMENTS

JP    2009-232307 A    10/2009
JP    2014-003481 A     1/2014

(Continued)

OTHER PUBLICATIONS

International Search Report and Written Opinion issued in International Patent Application No. PCT/JP2017/039896, dated Jan. 23, 2018; with partial English translation.

*Primary Examiner* — Joseph P Hirl
*Assistant Examiner* — Ka Shan Choy
(74) *Attorney, Agent, or Firm* — McDermott Will and Emery LLP

(57) ABSTRACT

An information output system includes a reception device and a processor. The reception device receives, via wireless communication, identification information or association information from at least one communications terminal to which the identification information is assigned. The association information is information about controllability of a target device associated with a target area where a person who carries the at least one communications terminal with him or her is currently present and is correlated to the identification information. The processor acquires the association information by reference to the information received at the reception device and outputs authorization information based on the association information. The authorization information is information used for enabling authorized control of the target device.

10 Claims, 4 Drawing Sheets

(51) Int. Cl.
    *F24F 11/523*    (2018.01)
    *F24F 11/62*    (2018.01)
    *G06Q 10/00*    (2012.01)
    *H04Q 9/00*    (2006.01)
    *G06F 21/30*    (2013.01)
    *F24F 120/10*    (2018.01)

(52) U.S. Cl.
    CPC .............. *G06Q 10/00* (2013.01); *H04Q 9/00* (2013.01); *F24F 2120/10* (2018.01)

(56) References Cited

U.S. PATENT DOCUMENTS

| | | | |
|---|---|---|---|
| 2012/0059530 A1* | 3/2012 | Luo | G05B 15/02 700/296 |
| 2013/0168038 A1* | 7/2013 | Ishizaka | F24F 3/065 165/11.1 |
| 2014/0158338 A1* | 6/2014 | Kates | F24F 11/83 165/237 |
| 2015/0277409 A1 | 10/2015 | Yamada | |
| 2017/0038787 A1* | 2/2017 | Baker | H04W 4/021 |
| 2017/0212485 A1* | 7/2017 | Lee | F24F 11/30 |
| 2017/0264979 A1 | 9/2017 | Masuda et al. | |
| 2019/0068791 A1* | 2/2019 | Okamoto | H04Q 9/00 |

FOREIGN PATENT DOCUMENTS

| | | |
|---|---|---|
| JP | 2016-053451 A | 4/2016 |
| JP | 2016-058988 A | 4/2016 |
| JP | 2016-116037 A | 6/2016 |
| WO | 2014/076756 A1 | 5/2014 |

\* cited by examiner

INFORMATION OUTPUT SYSTEM, DEVICE CONTROL SYSTEM, INFORMATION OUTPUT METHOD, AND PROGRAM

CROSS-REFERENCE OF RELATED APPLICATIONS

This application is the U.S. National Phase under 35 U.S.C. § 371 of International Patent Application No. PCT/JP2017/039896, filed on Nov. 6, 2017, which in turn claims the benefit of Japanese Application No. 2016-218469, filed on Nov. 8, 2016, the entire disclosures of which Applications are incorporated by reference herein.

TECHNICAL FIELD

The present invention relates to an information output system, a device control system, an information output method, and a program.

BACKGROUND ART

An air conditioner designed to improve comfortableness in a transition period before the air conditioner enters a stabilized period has been known in the art (see, for example, Patent Literature 1). The air conditioner of Patent Literature 1 includes a human detection sensor (movable body detection sensor) and a floor temperature detection sensor. The air conditioner controls at least one of an air blowing direction, an air volume, and the number of revolutions of its compressor by using the two types of sensors in combination. In other words, the air conditioner of Patent Literature 1 controls at least one of the air blowing direction, the air volume, and the number of revolutions of the compressor based on respective outputs of the human detection sensor and the floor temperature detection sensor. This allows the air conditioner to control air conditioning of a given room by always monitoring the room in its entirety such that the air blowing direction or any other parameter is changed quickly when the human detection sensor detects the movement of a human, thus improving the comfortableness in an area where the human is currently present without causing a delay from his or her movement.

The known air conditioner disclosed in Patent Literature 1, however, always gives authorization to control itself to whoever is present in the room to be air-conditioned (hereinafter referred to as a "target area").

CITATION LIST

Patent Literature

Patent Literature 1: JP 2016-53451 A

SUMMARY OF INVENTION

In view of the foregoing background, it is therefore an object of the present invention to provide an information output system, a device control system, an information output method, and a program, all of which are configured or designed to adaptively give authorization to control a target device associated with a target area, according to where the target area is and who is present in the target area.

An information output system according to an aspect of the present invention includes a generator and an output device. The generator generates authorization information based on association information. The output device outputs the authorization information. The generator acquires the association information either by reference to identification information provided by at least one communications terminal, to which the identification information is assigned, or as per the association information provided by the at least one communications terminal, and generate the authorization information based on the association information thus acquired. The association information is information about controllability of a target device associated with a target area where a person who carries the at least one communications terminal with him or her is currently present, and is correlated to the identification information. The authorization information is information used for enabling authorized control of the target device.

A device control system according to another aspect of the present invention includes: the information output system described above; and a device controller. The device controller controls the target device in accordance with the authorization information output from the output device.

An information output method according to still another aspect of the present invention includes the steps of: generating authorization information based on association information; and outputting the authorization information. The step of generating includes acquiring the association information either by reference to identification information provided by at least one communications terminal, to which the identification information is assigned, or as per the association information provided by the at least one communications terminal, and generating the authorization information based on the association information thus acquired. The association information is information about controllability of a target device associated with a target area where a person who carries the at least one communications terminal with him or her is currently present, and is correlated to the identification information. The authorization information is information used for enabling authorized control of the target device.

A program according to yet another aspect of the present invention is designed to make a computer execute: generation processing of generating authorization information based on association information; and output processing of outputting the authorization information. The generation processing includes acquiring the association information either by reference to identification information provided by at least one communications terminal, to which the identification information is assigned, or as per the association information provided by the at least one communications terminal, and generating the authorization information based on the association information thus acquired. The association information is information about controllability of a target device associated with a target area where a person who carries the at least one communications terminal with him or her is currently present, and is correlated to the identification information. The authorization information is information used for enabling authorized control of the target device.

DESCRIPTION OF EMBODIMENTS

Embodiments

An exemplary embodiment to be described below generally relates to an information output system, a device control system, an information output method, and a program. The embodiment more particularly relates to an information output system for outputting authorization information to enable authorized control of a target device, and a device control system including such an information output system. The embodiment also relates to an information output method for outputting the authorization information and a program to be executed to output the authorization information.

An information output system, device control system, information output method, and program according to an exemplary embodiment will be described in detail with reference to the accompanying drawings. Note that the exemplary embodiment to be described below is only one of various embodiments of the present invention and may be readily modified in various manners, depending on a design choice or any other factor, without departing from a true spirit and scope of the present invention.

(1) Overall Configuration of Device Control System

Figure 1:
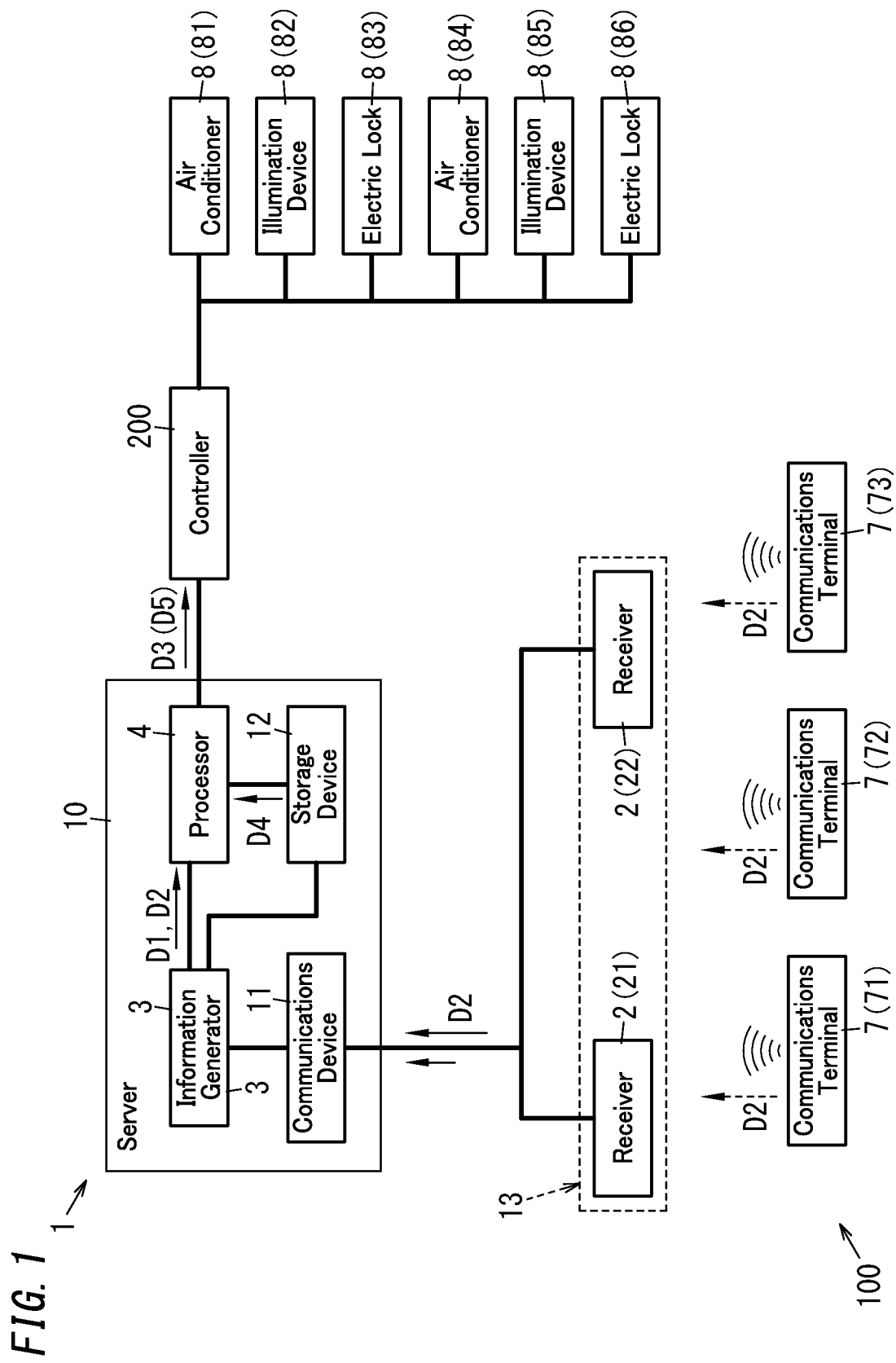
FIG. 1 is a block diagram of a device control system including an information output system according to an exemplary embodiment of the present invention.
Figure 2:
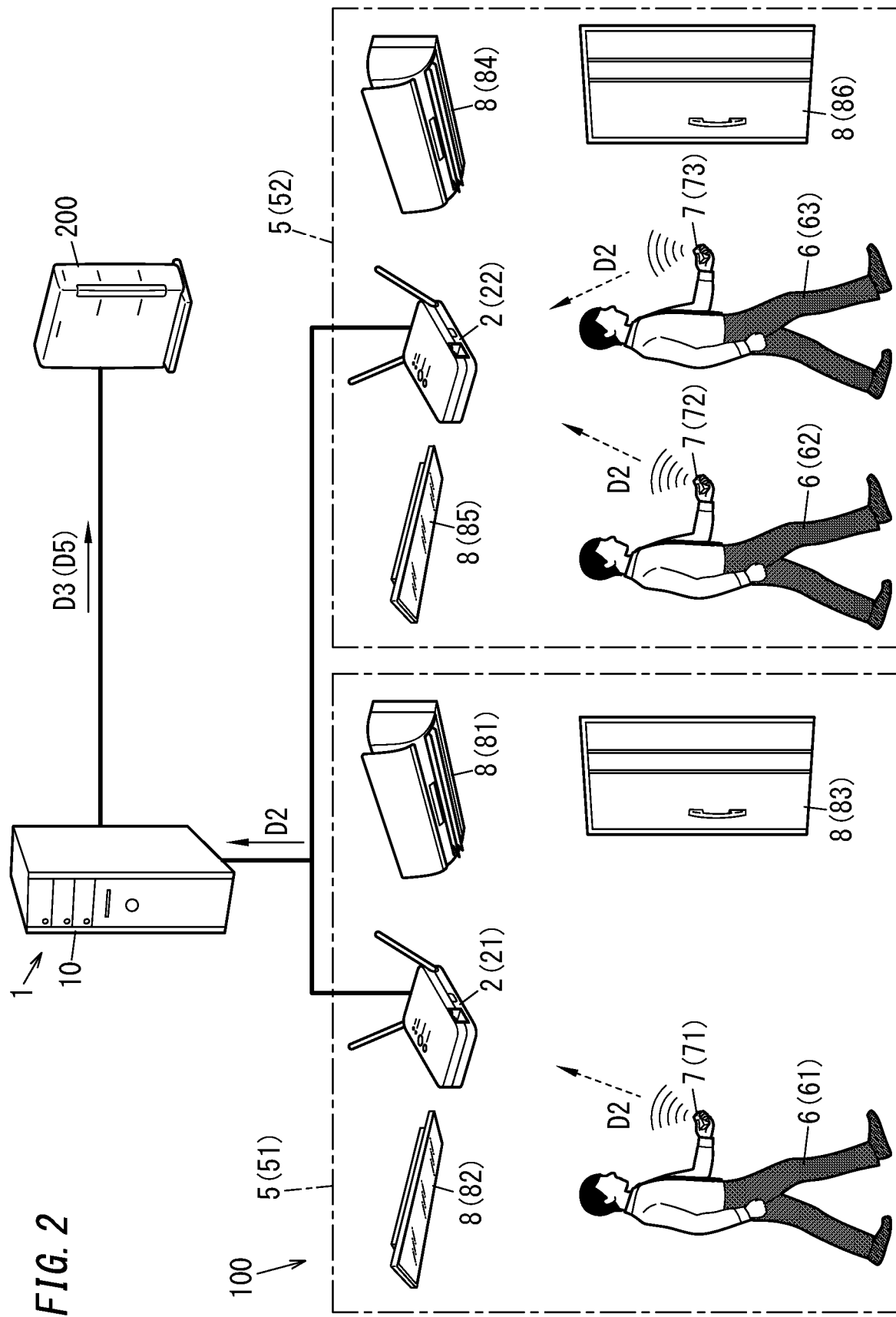
FIG. 2 schematically depicts an exemplary application of the information output system.

A device control system 100 according to this embodiment includes an information output system 1, a plurality of communications terminals 7, and a controller (device controller) 200 as shown in FIGS. 1 and 2.

The device control system 100 regulates the condition (such as an environmental condition or a security condition) in each area 5 of a building to a predetermined one by controlling the operations of a plurality of air conditioners 81, 84, a plurality of illumination devices 82, 85, and a plurality of electric locks 83, 86, all of which are examples of target devices 8. The building may be, for example, an office building including a plurality of areas 5 on each floor thereof. The area 5 may be part or all of an indoor space of an appropriate room, examples of which include an office, a laboratory for chemical or physical experiments, a library, a fitness room, and a washing room. In the following description, a situation where the area 5 is defined in each room of the building will be described as an example.

The plurality of air conditioners 81, 84 are arranged to be associated one to one with the plurality of areas 5. Each of the plurality of air conditioners 81, 84 is used to regulate the temperature in its associated area 5 to either a predetermined temperature or a temperature falling within a prescribed range. More specifically, a first air conditioner 81, which is one of the plurality of air conditioners 81, 84, is arranged in a first area 51 out of the plurality of areas 5 to regulate the temperature in the first area 51. A second air conditioner 84, which is another one of the plurality of air conditioners 81, 84, is arranged in a second area 52 out of the plurality of areas 5 to regulate the temperature in the second area 52.

The plurality of illumination devices 82, 85 are each include at least one light fixture and are arranged to be associated one to one with the plurality of areas 5. Each of the plurality of illumination devices 82, 85 is used to regulate the illuminance in its associated area 5 to either a predetermined illuminance or an illuminance falling within a prescribed range. More specifically, a first illumination device 82, which is one of the plurality of illumination devices 82, 85, is arranged in the first area 51 out of the plurality of areas 5 to regulate the illuminance in the first area 51. A second illumination device 85, which is another one of the plurality of illumination devices 82, 85, is arranged in the second area 52 out of the plurality of areas 5 to regulate the illuminance in the second area 52.

The plurality of electric locks 83, 86 are arranged to be associated one to one with the plurality of areas 5. Each of the plurality of electric locks 83, 86 is used to lock and unlock the entrance of its associated area 5. More specifically, a first electric lock 83, which is one of the plurality of electric locks 83, 86, is arranged in the first area 51 out of the plurality of areas 5 to lock and unlock the entrance in the first area 51. A second electric lock 86, which is another one of the plurality of electric locks 83, 86, is arranged in the second area 52 out of the plurality of areas 5 to lock and unlock the entrance in the second area 52.

(2) Controller

The controller 200 is configured to control the plurality of target devices 8 in accordance with control information D3 (authorization information D5) output from a processor 4 to be described later. More specifically, the controller 200 controls the respective operating conditions of the air conditioners 81, 84, the illumination devices 82, 85, and the electric locks 83, 86 by communicating with each of the air conditioners 81, 84, the illumination devices 82, 85, and the electric locks 83, 86. The controller 200 communicates with each of the air conditioners 81, 84, the illumination devices 82, 85, and the electric locks 83, 86 via wired or wireless communication. The controller 200 controls the target devices 8 in accordance with the control information D3 output from the information output system 1. The controller 200 controls the operating condition of each air conditioner 81 (84) by generating an air conditioner control signal based on the control information D3 for air conditioners and outputting the control signal to the air conditioner 81 (84). Also, the controller 200 controls the operating condition of each illumination device 82 (85) by generating an illumination device control signal based on the control information D3 for illumination devices and outputting the control signal to the illumination device 82 (85). Furthermore, the controller 200 controls the operating condition of each electric lock 83 (86) by generating an electric lock control signal based on the control information D3 for electric locks and outputting the control signal to the electric lock 83 (86).

(3) Communications Terminal

The plurality of communications terminals 7 are mobile telecommunications devices each configured to periodically output a wireless signal via radio waves, for example. Each communications terminal 7 may be implemented as a so-called "beacon terminal." The communication method of the wireless signal may be compliant with the Bluetooth® standard, for example. Alternatively, the communication method of the wireless signal may also be compliant with the Wi-Fi® standard or the specified small power radio standard, for example. The communications terminals 7 are carried by a plurality of users 6 of the building. Each of those users (persons) 6 may carry, with him or her, a particular communications terminal 7, assigned to him or her, out of the plurality of communications terminals 7. More specifically, a first user 61 carries a first communications terminal 71. A second user 62 carries a second communications terminal 72. A third user 63 carries a third communications terminal 73. That is to say, the communications terminals 7 are associated one to one with the respective users 6. Each of the plurality of users 6 is allowed to move freely between the plurality of areas 5 (e.g., a plurality of rooms).

Identification information D2 is assigned to the plurality of communications terminals 7. The identification information D2 is information for use to identify the plurality of communications terminals 7 from each other. In other words, the identification information D2 varies from one user 6 of the communications terminal 7 to another. The plurality of communications terminals 7 periodically transmits the identification information D2 as a wireless signal to the server 10. The identification information D2 may be stored in a nonvolatile memory of each of the communications terminals 7, for example.

(4) Information Output System

The information output system 1 includes a reception device 13 and a server 10 as shown in FIGS. 1 and 2. The information output system 1 has the capability of generating location information D1 about the location of a target area, where a user 6 carrying a communications terminal 7 with the ability to communicate with a plurality of receivers 2 is currently present, among the plurality of areas 5. The target area is an area where a user 6 carrying a communications terminal 7 with the ability to communicate with a plurality of receivers 2 is currently present, among the plurality of areas 5.

(4.1) Reception Device

The reception device 13 may include, for example, a plurality of receivers 2. The plurality of receivers 2 are respectively arranged in the plurality of areas 5. Each receiver 2 is configured to communicate wirelessly with the respective communications terminals 7. Specifically, each receiver 2 receives identification information D2 from the communications terminals 7. That is to say, the reception device 13 receives, via wireless communication, the identification information D2 from at least one communications terminal 7 to which the identification information D2 is assigned.

Each receiver 2 generates, based on a wireless signal received, information about the reception strength of the wireless signal received. Each receiver 2 transmits, by wireless communication via radio waves, that information to an information generator 3 of the server 10 to be described later. More specifically, each receiver 2 transmits, after having received a wireless signal from at least one communications terminal 7, the identification information D2, receiver information, and information about the reception strength of the wireless signal, to the server 10. Each receiver 2 stores the receiver information, allocated on a receiver basis, in its own nonvolatile memory, for example. The receiver information may be, for example, a three-digit number such as 001, 002, etc. However, this is only an example and should not be construed as limiting.

The plurality of receivers 2 are respectively arranged in a plurality of predetermined areas 5. That is to say, the plurality of receivers 2 are arranged to be associated one to one with the plurality of areas 5. Each of those areas 5 may be, for example, a circular area with a predetermined radius centered around its associated receiver 2. As used herein, the "predetermined radius" may refer to, for example, a distance within which the reception strength of the wireless signal received by the receiver 2 becomes equal to or greater than a predetermined threshold value.

The plurality of receivers 2 may sometimes transmit information about the reception strength of a wireless signal from a single communications terminals 7, out of the plurality of communications terminals 7, to the server 10. For example, in FIG. 2, a first receiver 21 and a second receiver 22, out of the plurality of receivers 2, are arranged to be associated with a first area 51 and a second area 52, respectively, which are adjacent to each other. In that case, the first receiver 21 and the second receiver 22 may both receive the wireless signal from the first communications terminal 71. In FIG. 2, the wireless signal received by the first receiver 21 has greater reception strength than the wireless signal received by the second receiver 22. This allows the server 10 to determine that the first communications terminal 71 should be present in the first area 51 in which the first receiver 21 is arranged.

In the following description, a combination of information about the reception strength of a wireless signal received by at least one receiver 2 out of the plurality of receivers 2 and receiver information transmitted by the wireless signal will be hereinafter referred to as "notification information." The notification information is a piece of information that allows the information generator 3 of the server 10 to be described later to locate the area where the at least one communications terminal 7 is present, among the plurality of areas 5. Thus, the plurality of receivers 2 outputs the notification information, indicating in what area the communications terminal 7 is currently present among the plurality of areas 5, to the information generator 3.

(4.2) Server

The server 10 includes a communications device 11, a storage device 12, an information generator 3, and a processor (generator, output device) 4 as shown in FIG. 1. The server 10 includes, as its major constituent element, a computer (which may be a microcomputer) including a processor and a memory. That is to say, the computer may perform the function of the server 10 by executing an appropriate program.

The communications device 11 receives the notification information from each of the plurality of receivers 2 and outputs the notification information received to the information generator 3.

The storage device 12 may be implemented as a programmable nonvolatile memory such as an electrically erasable programmable read-only memory (EEPROM).

The storage device 12 retains a location table. The location table provides information about the correspondence between the plurality of receivers 2 and the plurality of areas 5.

The storage device 12 stores a database defining, for each of the plurality of areas 5, correspondence between multiple pieces of identification information D2 to identify the plurality of communications terminals 7 from each other and multiple pieces of association information D4 about controllability of the target devices 8. The storage device 12 may store, for each of the areas 5 where the receivers 2 are respectively arranged, the correspondence such as the one shown in the following Table 1. Specifically, Table 1 indicates, for each piece of identification information D2, whether control of the air conditioner 81 (84) is permitted or prohibited, whether control of the illumination device 82 (85) is permitted or prohibited, and whether control of the electric lock 83 (86) is permitted or prohibited. In Table 1, the open circle indicates that the control is permitted and the cross indicates that the control is prohibited. For example, as for the identification information "1," control of the air conditioner 81 (84), control of the illumination device 82 (85), and control of the electric lock 83 (86) are all permitted. As for the identification information "3," only control of the electric lock 83 (86) is permitted and control of the air conditioner 81 (84) and control of the illumination device 82 (85) are prohibited. In Table 1, "Name" indicates the name of the user 6 and correlated to the identification information D2.

TABLE 1

|        | Identification Information | Degree of Priority | Time Slot | Air Conditioner | Illumination Device | Electric Lock |
|--------|---------------------------|--------------------|-----------|-----------------|---------------------|---------------|
| Name 1 | 1                         | 5                  | 0-24      | o               | o                   | o             |
| Name 2 | 2                         | 4                  | 7-22      | o               | o                   | x             |
| Name 3 | 3                         | 3                  | 9-17      | x               | x                   | o             |
| ...    | ...                       | ...                | ...       | ...             | ...                 | ...           |
| Name n | n                         | 1                  | 11-15     | o               | x                   | o             |

As used herein, the association information D4 is information indicating whether control of the target devices 8 is permitted or prohibited. In the example shown in Table 1, the association information D4 indicates whether control of each of the air conditioner 81, illumination device 82, and electric lock 83 that are associated with the first area 51 is permitted or prohibited. The association information D4 also indicates whether control of each of the air conditioner 84, illumination device 85, and electric lock 86 that are associated with the second area 52 is permitted or prohibited.

In addition, in the database stored in the storage device 12, each piece of identification information D2 has its corresponding degree of priority. If the reception device 13 has received two pieces of identification information D2, the higher priority is given to authorization correlated to the identification information D2 with the higher degree of priority. For example, if the reception device 13 has received identification information "1" and identification information "3," then authorization correlated to the identification information "1" with the higher degree of priority is selected. That is to say, in that case, control of each of the air conditioner 81 (84), the illumination device 82 (85), and the electric lock 83 (86) is permitted.

Furthermore, in the database, each piece of identification information D2 has its corresponding time slot. The authorization to control the target devices 8 is changed according to the time when the reception device 13 receives the identification information D2. For example, if the reception device 13 has received the identification information "2" at 10:00, then control of the air conditioner 81 (84) and control of the illumination device 82 (85) are permitted. On the other hand, if the reception device 13 has received the identification information "2" at 20:00, then control of no target devices 8 is permitted.

The information generator 3 receives the identification information D2 and the notification information (including receiver information and information about the reception strength) from at least one receiver 2. The information generator 3 determines, by reference to the notification information, in which of the plurality of areas 5 at least one communications terminal 7 is currently present. If the information generator 3 has received the identification information D2 and the notification information from a single receiver 2, then the information generator 3 locates, by reference to the location table with the receiver information of the notification information, the area 5 where a single communications terminal 7 is currently present. On the other hand, if the information generator 3 has received multiple pieces of identification information D2 and multiple pieces of notification information from a plurality of receivers 2, then the information generator 3 compares the reception strengths included in multiple pieces of notification information with each other. The information generator 3 locates, by reference to the location table with the receiver information of notification information associated with the greatest reception strength about a particular communications terminal 7, the area 5 where the particular communications terminal 7 is currently present. Then, the information generator 3 generates location information D1 about the area 5 where the particular communications terminal 7 is currently present. The information generator 3 outputs the location information D1 and the identification information D2 to the processor 4.

The processor 4 determines, according to the number of communications terminals 7 present in the target area and the number of users 6 present there, parameters for establishing a predetermined condition in the target area where the communications terminal(s) 7 is/are currently present, as control information D3.

The processor 4 acquires association information D4 by reference to the information received by the reception device 13, generates control information D3 (i.e., authorization information D5) based on the association information D4, and outputs the control information D3. More specifically, the processor 4 extracts, with respect to the target area located by the location information D1 generated by the information generator 3, association information D4, correlated to the identification information D2 received by the reception device 13, from the database in the storage device 12. Then, the processor 4 generates control information D3 based on the association information D4 and outputs the control information D3 to the controller 200 (device controller) that controls the target devices 8. The authorization information D5 is information for use to enable authorized control of the target devices 8. The control information D3 is information for use to instruct the target devices 8 to accept the authorized control.

The correspondence between the identification information D2 and the association information D4 varies from one time slot to another. Thus, the processor 4 generates the control information D3 (i.e., authorization information D5) based on the association information D4 satisfying the correspondence for a time slot including the current time, and outputs the control information D3.

Also, multiple pieces of identification information D2 are given respective degrees of priority. Thus, when the reception device 13 receives multiple pieces of identification information D2 from a plurality of communications terminals 7, the processor 4 generates control information D3 based on the association information D4 correlated to a piece of the identification information D2 with the highest degree of priority among the multiple pieces of the identification information D2 received by the reception device 13 and outputs the control information D3.

The processor 4 generates, based on the location information D1 and the identification information D2, control information D3 for use to control the target devices 8 arranged in the target area where the communications terminal 7 is currently present. Then, the processor 4 outputs the control information D3 to the controller 200.

Optionally, the processor 4 may determine the specifics of the control of the target devices 8 in accordance with the location information D1 of the target area where the user 6 is currently present and individual information about each user 6 (such as his or her preferences, attributes, and fitness level).

In addition, the processor 4 has the capability of updating the database in the storage device 12. The association information D4, the degrees of priority, or the time slot may be changed by an administrator, for example.

(4.3) Program

In this information output system 1, the receivers 2 and the storage device 12 store a program designed to make the information output system 1 perform respective functions. That is to say, the storage device 12 stores a program designed to make a computer perform the functions of the communications device 11, the information generator 3, and the processor 4.

The program may be stored in advance in the storage device 12 before the information output system 1 is shipped. However, this is only an example and should not be construed as limiting. Alternatively, the program may also be acquired by the information output system 1 after the information output system 1 has been shipped. In that case, an exemplary technique for allowing the information output system 1 to acquire the program after the information output system 1 has been shipped may be to use a computer-readable storage medium that stores the program thereon. When such a technique using a storage medium is adopted, the information output system 1 needs to include a reader (not shown) for reading data from the storage medium. Examples of the storage media include optical discs and memory cards. As the reader, an optical drive for reading information from optical discs or a memory card reader for reading information from memory cards may be used. Another exemplary technique for allowing the information output system 1 to acquire the program may be downloading the program from an external device (not shown) over a network. When such a technique for downloading the program is adopted, the information output system 1 needs to have the communication capability of communicating with an external device over the network.

(5) Operation of information output system

Figure 3:
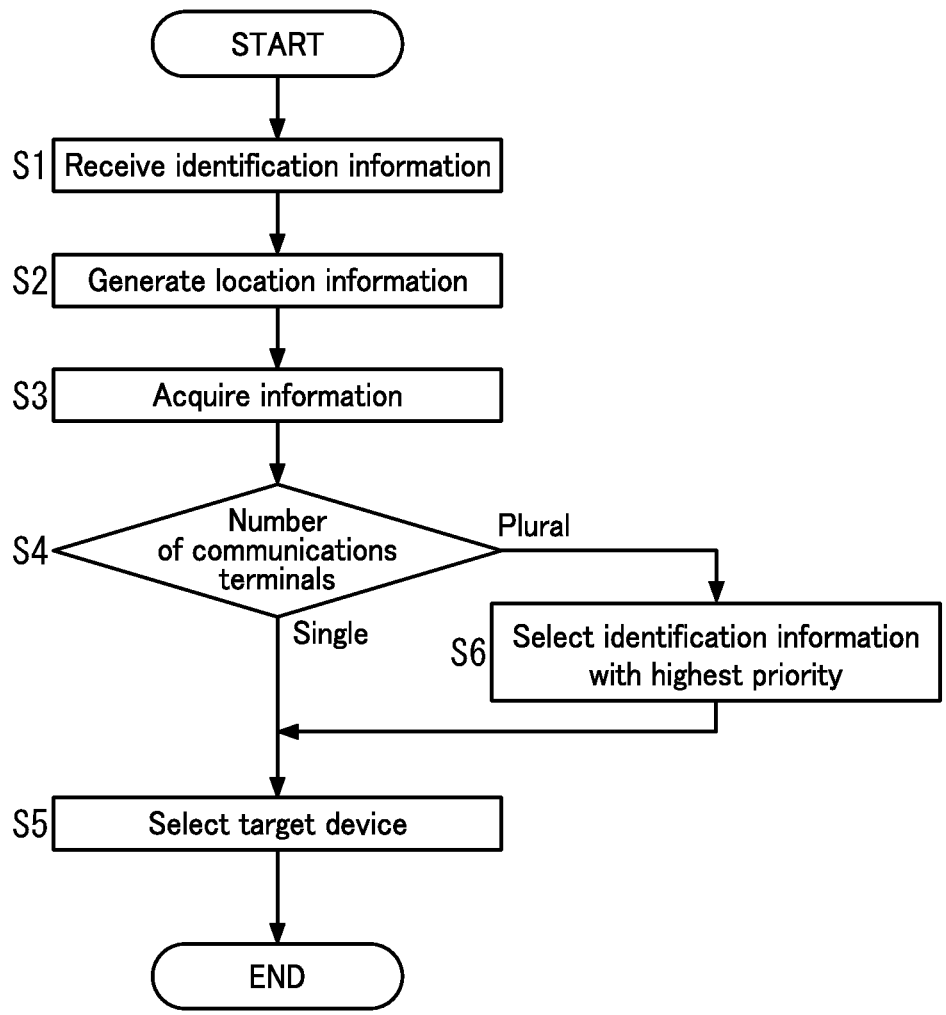
FIG. 3 is a flowchart illustrating how the device control system operates.

Next, it will be described with reference to FIG. 3 how the information output system 1 according to this embodiment operates.

First, the reception device 13 receives identification information D2 from a communications terminal 7 (in Step S1). On acquiring the identification information D2 from the reception device 13, the information generator 3 generates location information D1 indicating the location of the reception device 13 (i.e., the location of the target area where the user 6 carrying the communications terminal 7 with him or her is currently present) (in Step S2). Thereafter, the processor 4 acquires the location information D1, the identification information D2, and information about the number of communications terminals 7 from the information generator 3 (in Step S3). Then, the processor 4 determines whether the number of the communications terminals 7 is single or plural (in Step S4). On finding the number of the communications terminals 7 to be single (if the answer is "single" in Step S4), the processor 4 extracts, from the database in the storage device 12, association information D4 correlated to the identification information D2 of the communications terminal 7 to select a target device 8, the control of which is authorized (in Step S5).

On the other hand, on finding the number of the communications terminals 7 to be plural (if the answer is "plural" in Step S4), the processor 4 selects a piece of identification information D2 with the highest degree of priority from multiple pieces of identification information D2 assigned to the plurality of communications terminals 7 (in Step S6). The processor 4 extracts, from the database, association information D4 correlated to the piece of identification information D2 with the highest degree of priority to select a target device, the control of which is authorized (in Step S5).

(6) Advantages

The information output system 1 according to the exemplary embodiment described above receives either identification information D2 assigned to a communications terminal 7 or association information D4 correlated to the identification information D2 and indicating controllability of a target device 8 associated with a target area. Then, the information output system 1 outputs authorization information D5 based on the association information D4 derived from the information received. This allows for adaptively giving authorization to control the target device 8 according to where the target area is and what the identification information D2 designates, thus enabling optimized device control on a place (target area) and individual (person who is currently present in the target area) basis.

The information output system 1 according to the exemplary embodiment outputs the control information D3 to the device controller, thus automatically performing optimized device control on a place and individual basis.

In the information output system 1 according to the exemplary embodiment, the association information D4 correlated to the identification information D2 is stored on the system end. This facilitates management of the association information D4 compared to a situation where the association information D4 is stored on the communications terminal 7 end.

In the information output system 1 according to the exemplary embodiment, the same piece of identification information D2 is correlated to different pieces of association information D4 from one time slot to another. This allows the device control to be optimized on a time slot basis.

The information output system 1 according to the exemplary embodiment prioritizes outputting the authorization information D5 based on the association information D4 correlated to the identification information D2 with a higher degree of priority. This allows a device control suitable for a particular person to be prioritized.

The information output system 1 according to the exemplary embodiment stores a database defining, for each of a plurality of areas 5, correspondence between the identification information D2 and the association information D4. This facilitates management and change of the correspondence between the identification information D2 and the association information D4.

The device control system 100 according to the exemplary embodiment controls the target device 8 in accordance with the authorization information D5 output from the processor 4. This allows for adaptively giving authorization to control the target device 8 according to where the target area is and what the identification information D2 designates, thus enabling optimized device control on a place and individual basis.

The information output method according to the exemplary embodiment includes receiving either identification information D2 assigned to a communications terminal 7 or association information D4 correlated to the identification information D2 and indicating controllability of a target device 8 associated with a target area. Then, according to the information output method, authorization information D5 based on the association information D4 derived from the information received is output. This allows for adaptively giving authorization to control the target device 8 according to where the target area is and what the identification information D2 designates, thus enabling optimized device control on a place and individual basis.

In the program according to the exemplary embodiment, a computer is made to execute the processing of receiving either identification information D2 assigned to a communications terminal 7 or association information D4 correlated to the identification information D2 and indicating controllability of the target device 8 associated with the target area. Then, according to the program, the computer is made to execute the processing of outputting authorization information D5 based on the association information D4 derived from the information received. This allows for adaptively giving authorization to control the target device 8 according to where the target area is and what the identification information D2 designates, thus enabling optimized device control on a place and individual basis.

(7) Variations

Optionally, in the database stored in the storage device 12, the correspondence between the multiple pieces of identification information D2 and the multiple pieces of association information D4 may be identical for two or more of the plurality of areas 5. This allows the same authorization to be granted to two or more areas 5. In that case, there is no need to individually define associated information D4 for the areas 5 with the same purpose.

Also, in the database, the same piece of association information D4 may be correlated to two or more of the multiple pieces of identification information D2. This simplifies granting authorization, compared to a situation where authorization is granted on an individual basis.

The reception device 13 may receive the association information D4 from a communications terminal 7 via wireless communication. In that case, the generator (processor 4) generates authorization information D5 based on the association information D4 provided by the communications terminal 7. Receiving the association information D4 from the communications terminal 7 eliminates the need for the information output system 1 to manage the association information D4.

In other words, in that case, the processor 4 acquires the association information D4 provided by the communications terminal 7 and generates authorization information D5 based on the association information D4. In short, the processor 4 needs to acquire either the identification information D2 or association information D4 from the communications terminal 7. As used herein, "to acquire association information D4 either by reference to identification information D2 provided by a communications terminal 7, or as per the association information D4 provided by a communications terminal 7" refers to both acquiring the association information D4 by reference to the identification information D2 provided by the communications terminal 7 when the communications terminal 7 is configured to provide the identification information and acquiring the association information D4 as per the association information D4 provided by the communications terminal 7 when the communications terminal 7 is configured to provide the association information.

Figure 4:
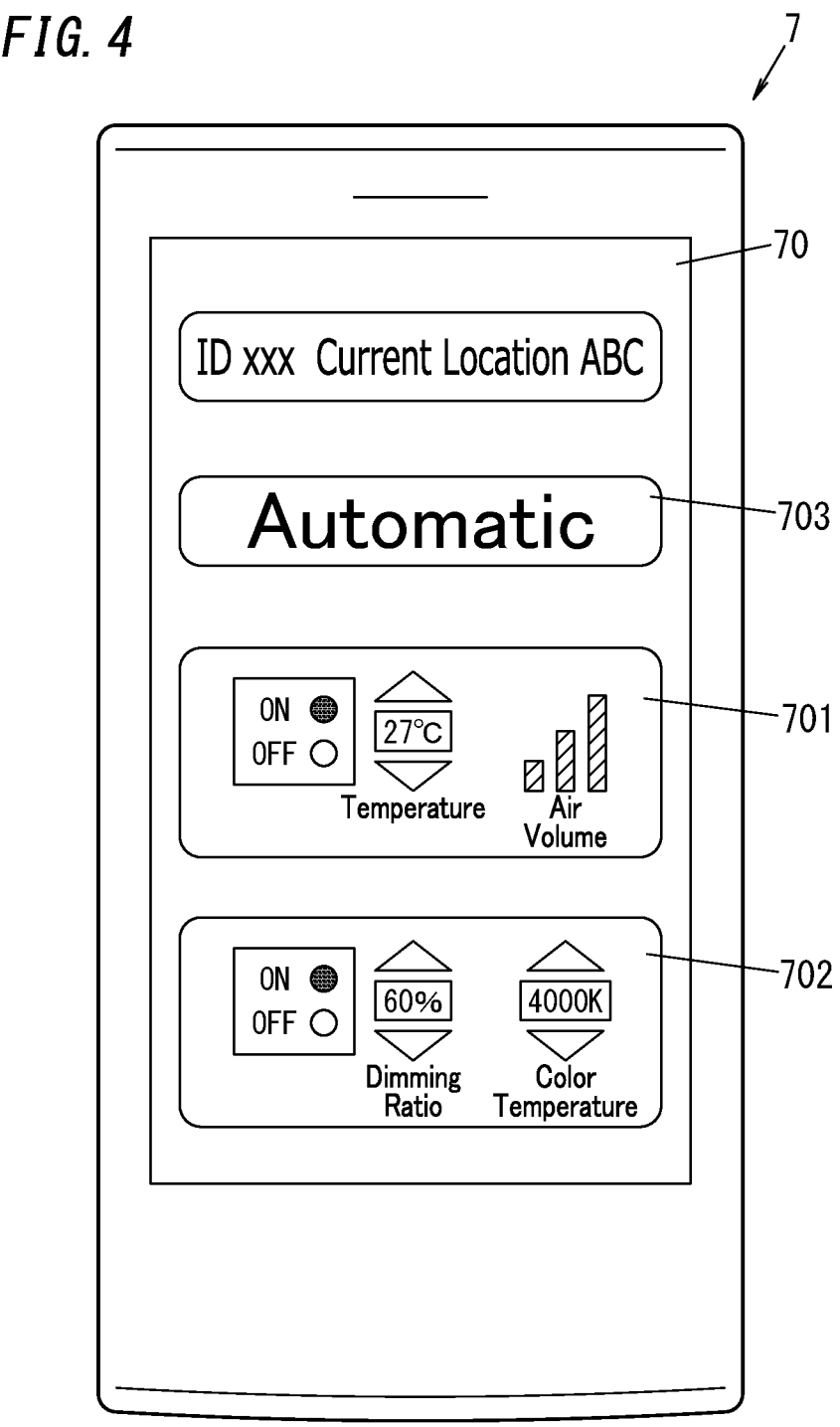
FIG. 4 is a front view of an exemplary on-screen image of a communications terminal.

The authorization information D5 output from the output device (processor 4) does not have to be the control information D3 but may also be screen information about an operating screen 70 for accepting the operation of performing an authorized control of the target devices 8. In that case, the output device outputs the screen information to the communications terminal 7 of the user 6 who is currently present in the target area. In accordance with the screen information, the communications terminal 7 may display an operating screen 70 such as the one shown in FIG. 4, for example. The operating screen 70 shown in FIG. 4 indicates a situation where control of the air conditioner 81 (84) and control of the illumination device 82 (85) are authorized (or permitted) and control of the electric lock 83 (86) is prohibited (or prohibited). The operating screen 70 of the communications terminal 7 includes an operating section 701 for controlling the air conditioner 81 (84) and an operating section 702 for controlling the illumination device 82 (85). On the other hand, since the communications terminal 7 is not authorized to control the electric lock 83 (86), letters 703 indicating automatic control are displayed. This allows, when the communications terminal 7 has the capability of displaying an operating screen 70 for accepting an operation of controlling the target devices 8, the user 6 to change the operating screen 70 in accordance with the authorization information D5. This indicates, to the user 6, what target devices 8 are controllable for him or her.

On receiving control commands from a plurality of communications terminals 7, each having the capability of displaying the operating screen 70, the processor 4 generates control information D3 by following the majority rule or by calculating an average, for example, and outputs the control information D3 to the controller 200. For example, the processor 4 may generate control information D3 in accordance with the control command given most frequently, and outputs the control information D3 to the controller 200. Alternatively, if the control commands are temperature settings for the air conditioner 81 (84) or dimming ratios for the illumination device 82 (85), then the processor 4 may generate control information D3 based on the average of the temperature settings or dimming ratios given as control commands, and output the control information D3 to the controller 200.

Note that the reception device 13 does not always have to include a plurality of receivers 2 but may consist of a single receiver as well. For example, if the plurality of communications terminals 7 are each configured to be able to transmit global positioning system (GPS) information to the reception device 13, the reception device 13 needs to include at least one receiver.

Optionally, the reception device 13 may include not only the plurality of receivers 2 but also a plurality of cameras and a plurality of contactless card readers as well. The plurality of cameras may be respectively arranged in the plurality of areas 5 and each capture an image of its associated area 5 and output the image captured to the information generator 3. The information generator 3 detects the presence or absence of any user 6 in/from the area by image recognition capability, for example, and locates the area 5 where any user 6 is currently present based on the decision about the presence or absence of any human in/from the respective areas 5 where the cameras are installed. Optionally, each camera may have the image recognition capability and be configured to output the result of the image recognition to the information generator 3.

The contactless card readers may be devices for locking and unlocking rooms corresponding to the plurality of areas 5, for example. Whenever any user 6 enters or leaves a room corresponding to each area 5, the associated contactless card reader reads an unlocking card key by contactless method. The contactless card reader outputs information about the user's 6 entering and leaving the room to the information generator 3. The information generator 3 locates, by reference to the information about the user's 6 entering and leaving any room and information about rooms corresponding to the respective areas 5, the area 5 where the user's 6 communications terminal 7 is currently present.

Optionally, the information output system 1 may further include a plurality of sensors respectively provided for the plurality of areas 5. Each of those sensors may be a temperature sensor, for example. Alternatively, each of the temperature sensors may be built in an associated communications terminal 7.

Each of the plurality of target devices 8 may also be a water supply and drainage system, a display device, or an acoustic device, for example. Each device may regulate the amount of water supplied to, or drained from, each area 5, the content displayed on the display device, or the volume of the acoustic device, for example.

The number of the users 6 does not have to be three but may also be one, two, or even four or more.

The device control system 100 does not have to include the controller 200. If the device control system 100 includes no controllers 200, the server 10 may be configured to transmit the control information D3 to a controller 200 provided separately from the device control system 100. The controller 200 for controlling the respective devices is not an essential constituent element but may also be omitted if the server 10 has the ability to perform the function of the controller 200.

The information generator 3 and the processor 4 do not have to be implemented as the server 10 but may also be implemented as a different type of device from the server 10.

The device control system 100 may also be used in, for example, a single-family dwelling house with a plurality of rooms.

As for the plurality of areas 5, a single area 5 is not always defined per room. Alternatively, a plurality of areas 5 may be defined per room as well. For example, if a spatial dimension of an office is greater than a distance over which each communications terminal 7 is able to establish communication, a plurality of areas 5 may be defined in the office. Furthermore, the area 5 does not have to be defined indoors but may also be a particular area 5 in an outdoor facility such as an athletic ground.

Furthermore, the plurality of communications terminals 7 do not have to be beacon terminals but may also be smartphones, tablet computers, or any other type of mobile telecommunications devices used by users. Alternatively, the communications terminals 7 may be portable personal computers as well. In that case, the reception device 13 may be configured to receive a wireless signal transmitted from each communications terminal 7.

Furthermore, in the embodiment described above, the device control system 100 is implemented as a combination of the reception device 13, the server 10, and the controller 200. However, this is only an example and should not be construed as limiting. Alternatively, at least two selected from the group consisting of the reception device 13, the server 10, and the controller 200 may be integrated together. Furthermore, the communications device 11, the storage device 12, the information generator 3, and the processor 4 are included in the single server 10 in the embodiment described above, but may also be distributed in two or more devices as well. Optionally, the function of at least one selected from the group consisting of the communications device 11, the storage device 12, the information generator 3, and the processor 4 may be provided for the reception device 13. Furthermore, the functions of the processor 4 serving as a generator for generating the authorization information D5 and as an output device for outputting the authorization information D5 may be provided in two separate devices.

Furthermore, at least some functions of the device control system 100 may be performed by cloud computing as well.

(8) Resume

The following aspects are disclosed herein which are exemplified by the embodiments and their variations described above.

An information output system (1) according to a first aspect includes a generator (processor 4) and an output device (processor 4). The generator generates authorization information (D5) based on association information (D4). The output device outputs the authorization information (D5). The generator acquires the association information (D4) either by reference to identification information (D2) provided by at least one communications terminal (7), to which the identification information (D2) is assigned, or as per the association information (D4) provided by the at least one communications terminal (7), and generate the authorization information (D5) based on the association information (D4) thus acquired. The association information (D4) is information about controllability of a target device (8) associated with a target area where a person (user 6) who carries the at least one communications terminal (7) with him or her is currently present, and is correlated to the identification information (D2). The authorization information (D5) is information used for enabling authorized control of the target device (8).

The information output system (1) according to the first aspect receives either the identification information (D2) assigned to the communications terminal (7) or the association information (D4) correlated to the identification information (D2) and indicating controllability of the target device (8) associated with the target area. Then, the information output system (1) outputs authorization information (D5) based on the association information (D4) derived from the information received. This allows for adaptively giving authorization to control a target device (8) according to where the target area is and what the identification information (D2) designates, thus enabling optimized device control on a place (target area) and individual (person who is currently present in the target area) basis.

In an information output system (1) according to a second aspect, which may be implemented in conjunction with the first aspect, the authorization information (D5) is control information (D3) for instructing the target device (8) to accept the authorized control. The processor (4) outputs the control information (D3) to a device controller (controller 200) to control the target device (8).

The information output system (1) according to the second aspect outputs the control information (D3) to the device controller, thus automatically performing optimized device control on a place and individual basis.

An information output system (1) according to a third aspect, which may be implemented in conjunction with the first or second aspect, further includes a reception device (13). The reception device (13) receives, via wireless communication, the identification information (D2) from the communications terminal (7). The generator (processor 4) generates the authorization information (D5) based on the association information (D4) correlated to the identification information (D2) provided by the communications terminal (7).

In the information output system (1) according to the third aspect, the association information (D4) correlated to the identification information (D2) is stored on the system end (i.e., in the information output system 1). This facilitates management of the association information (D4) compared to a situation where the association information (D4) is stored on the communications terminal (7) end.

In an information output system (1) according to a fourth aspect, which may be implemented in conjunction with the third aspect, correspondence between the identification information (D2) and the association information (D4) varies from one time slot to another. The generator (processor 4) generates the authorization information (D5) based on the association information (D4) satisfying the correspondence for a time slot including a current time.

In the information output system (1) according to the fourth aspect, the same piece of identification information (D2) is correlated to different pieces of association information (D4) from one time slot to another. This allows the device control to be optimized on a time slot basis.

In an information output system (1) according to a fifth aspect, which may be implemented in conjunction with the third or fourth aspect, the at least one communications terminal (7) includes a plurality of communications terminals (7). The identification information (D2) includes multiple pieces of identification information (D2) that are provided by the plurality of communications terminals (7), respectively, and given respective degrees of priority. The generator (processor 4) generates the authorization information (D5) based on the association information (D4) correlated to a piece of the identification information (D2) with the highest degree of priority among the multiple pieces of identification information (D2) provided by the plurality of communications terminals (7).

The information output system (1) according to the fifth aspect prioritizes outputting the authorization information (D5) based on the association information (D4) correlated to the identification information (D2) with a higher degree of priority. This allows a device control suitable for a particular person to be prioritized.

An information output system (1) according to a sixth aspect, which may be implemented in conjunction with any one of the third to fifth aspects, further includes a storage device (12). The storage device (12) stores a database defining, for each of a plurality of areas (5), correspondence between multiple pieces of identification information (D2) to identify a plurality of communications terminals (7) from each other and multiple pieces of association information (D4) about controllability of the target device (8). The generator (processor 4) generates a piece of the authorization information (D5) for the target area based on a piece of the association information (D4) by extracting, from the database, the piece of the association information (D4) correlated to a piece of the identification information (D2) provided by the at least one communications terminal (7).

The information output system (1) according to the sixth aspect stores a database defining, for each of a plurality of areas (5), correspondence between the identification information (D2) and the association information (D4). This facilitates management and change of the correspondence between the identification information (D2) and the association information (D4).

In an information output system (1) according to a seventh aspect, which may be implemented in conjunction with the sixth aspect, in the database, the correspondence between the multiple pieces of identification information (D2) and the multiple pieces of association information (D4) is identical for two or more of the plurality of areas (5).

In an information output system (1) according to an eighth aspect, which may be implemented in conjunction with the sixth or seventh aspect, in the database, an identical piece of association information (D4) is correlated to two or more of the multiple pieces of identification information (D2).

In an information output system (1) according to a ninth aspect, which may be implemented in conjunction with the first aspect, the generator (processor 4) generates the authorization information (D5) based on the association information (D4) provided by the at least one communications terminal (7).

A device control system (100) according to a tenth aspect includes: the information output system (1) according to any one of the first to ninth aspects; and a device controller (controller 200). The device controller controls the target device (8) in accordance with the authorization information (D5) output from the generator (processor 4).

The device control system (100) according to the tenth aspect controls the target device (8) in accordance with the authorization information (D5) output from the generator (processor 4). This allows for adaptively giving authorization to control the target device (8) according to where the target area is and what the identification information (D2) designates, thus enabling optimized device control on a place and individual basis.

An information output method according to an eleventh aspect includes the steps of: generating authorization information (D5) based on association information (D4); and outputting the authorization information (D5). The step of generating includes acquiring either identification information (D2) or the association information (D4) from at least one communications terminal (7), to which the identification information (D2) is assigned, and generating the authorization information (D5) based on the association information (D4) thus acquired. The association information (D4) is information about controllability of a target device (8) associated with a target area where a person (user 6) who carries the at least one communications terminal (7) with him or her is currently present, and is correlated to the identification information (D2). The authorization information (D5) is information used for enabling authorized control of the target device (8).

The information output method according to the eleventh aspect includes receiving either the identification information (D2) assigned to the communications terminal (7) or association information (D4) correlated to the identification information (D2) and indicating controllability of the target device (8) associated with the target area. Then, according to the information output method, authorization information (D5) based on the association information (D4) derived from the information received is output. This allows for adaptively giving authorization to control the target device (8) according to where the target area is and what the identification information (D2) designates, thus enabling optimized device control on a place and individual basis.

A program according to a twelfth aspect is designed to make a computer execute: generation processing of generating authorization information (D5) based on association information (D4); and output processing of outputting the authorization information (D5). The generation processing includes acquiring the association information (D4) either by reference to identification information (D2) provided by at least one communications terminal (7), to which the identification information (D2) is assigned, or as per the association information (D4) provided by the at least one communications terminal (7), and generating the authorization information (D5) based on the association information (D4) thus acquired. The association information (D4) is information about controllability of a target device (8) associated with a target area where a person (user 6) who carries the at least one communications terminal (7) with him or her is currently present, and is correlated to the identification information (D2). The authorization information (D5) is information used for enabling authorized control of the target device (8).

In the program according to the twelfth aspect, a computer is made to execute the processing of receiving either the identification information (D2) assigned to the communications terminal (7) or association information (D4) correlated to the identification information (D2) and indicating controllability of the target device (8) associated with the target area. Then, according to the program, the computer is made to execute the processing of outputting authorization information (D5) based on the association information (D4) derived from the information received. This allows for adaptively giving authorization to control the target device (8) according to where the target area is and what the identification information (D2) designates, thus enabling optimized device control on a place and individual basis.

REFERENCE SIGNS LIST

1 Information Output System
4 Processor (Generator, Output device)
5 Area
6 User (person who carries communications terminal)
7 Communications Terminal
8 Target Device
12 Storage device
13 Reception device
100 Device Control System
200 Controller (Device Controller)
D2 Identification Information
D3 Control Information
D4 Association Information
D5 Authorization Information

The invention claimed is:
1. An information output system comprising:
a reception device configured to receive, via a wireless communication, identification information from at least one communications terminal;
a generator configured to generate authorization information based on association information; and
an output device configured to output the authorization information, wherein:
the generator is configured to acquire the association information by reference to the identification information provided by the at least one communications terminal, to which the identification information is assigned, and generate the authorization information based on the association information correlated to the identification information provided by the at least one communications terminal,
the association information is information about controllability of a target device associated with a target area where a person who carries the at least one communications terminal with him or her is currently present, the association information being correlated to the identification information,
the authorization information is information used for enabling authorized control of the target device,
the information output system further comprises a storage device that stores a database defining, for each of a plurality of areas, correspondence between multiple pieces of identification information to identify a plurality of communications terminals from each other and multiple pieces of association information about controllability of the target device,
the generator is configured to generate a piece of the authorization information for the target area based on a piece of the association information by extracting, from the database, the piece of the association information correlated to a piece of the identification information provided by the at least one communications terminal, and
in the database. the correspondence between the multiple pieces of identification information and the multiple pieces of association information is identical for two or more of the plurality of areas.

2. The information output system of claim 1, wherein
the authorization information is control information for instructing the target device to accept the authorized control, and
the output device is configured to output the control information to a device controller configured to control the target device.

3. The information output system of claim 1, wherein
correspondence between the identification information and the association information varies from one time slot to another, and
the generator is configured to generate the authorization information based on the association information satisfying the correspondence for a time slot including a current time.

4. The information output system of claim 3, wherein
the at least one communications terminal includes a plurality of communications terminals,
the identification information includes multiple pieces of identification information that are provided by the plurality of communications terminals, respectively, and given respective degrees of priority, and
the generator is configured to generate the authorization information based on the association information correlated to a piece of the identification information with the highest degree of priority among the multiple pieces of identification information provided by the plurality of communications terminals.

5. The information output system of claim 1, wherein
the at least one communications terminal includes a plurality of communications terminals,
the identification information includes multiple pieces of identification information that are provided by the plurality of communications terminals, respectively, and given respective degrees of priority, and
the generator is configured to generate the authorization information based on the association information correlated to a piece of the identification information with the highest degree of priority among the multiple pieces of identification information provided by the plurality of communications terminals.

6. The information output system of claim 1. wherein
in the database, an identical piece of association information is correlated to two or more of the multiple pieces of identification information.

7. The information output system of claim 1, wherein
the generator is configured to generate the authorization information based on the association information provided by the at least one communications terminal.

8. A device control system comprising:
the information output system of claim 1; and
a device controller configured to control the target device accordance: with the authorization information output from the output device.

9. An information output method comprising steps of:
receiving, via wireless communication, identification information from at least one communications terminal,
generating authorization information based on association information; and
outputting the authorization information, wherein:
the step of generating comprises acquiring the association information by reference to the identification information provided by the at least one communications terminal, to which the identification information is assigned, and generating the authorization information based on the association information correlated to the identification information provided by the at least one communications terminal.
the association information is information about controllability of a target device associated with a target area where a person who carries the at least one communications terminal with him or her is currently present, the association information being correlated to the identification information,
the authorization information is information used for enabling authorized control of the target device,
the information output method further comprises storing, in a storage device, a database defining, for each of a plurality of areas, correspondence between multiple pieces of identification information to identify a plurality of communications terminals from each other and multiple pieces of association information about controllability of the target device,
the step of generating comprises generating a piece of the authorization information for the target area based on a piece of the association information by extracting, from the database, the piece of the association information correlated to a piece of the identification information provided by the at least one communications terminal, and
in the database, the correspondence between the multiple pieces of identification information and the multiple pieces of association information is identical for two or more of the plurality of areas.

10. A non-transitory computer-readable storage medium that stores a program designed to make a computer execute:
reception processing receiving via wireless communication, identification information from at least one communications terminal,
generation processing of generating authorization information based on association information; and
output processing of outputting the authorization information, wherein:
the generation processing comprises acquiring the association information by reference to the identification information provided by the at least one communications terminal, to which the identification information is assigned, and generating the authorization information based on the association information correlated to the identification information provided by the at least one communications terminal,
the association information is information about controllability of a target device associated with a target area where a person who carries the at least one communications terminal with him or her is currently present, the association information being correlated to the identification information,
the authorization information is information used for enabling authorized control of the target device,
the program is designed to make the computer further execute store processing of storing, in a storage device, a database defining, for each of a plurality of areas correspondence between multiple pieces of identification information to identify a plurality of communications terminals from each other and multiple pieces of association information about controllability of the target device,
the generation processing comprises generating a piece of the authorization information for the target area based on a piece of the association information by extracting, from the database. the piece of the association information correlated to a piece of the identification information provided by the at least one communications terminal and
in the database. the correspondence between the multiple pieces of identification information and the multiple pieces of association information is identical for two or more of the plurality of areas.

* * * * *